United States Patent [19]

Kabeya et al.

[11] Patent Number: 5,331,337

[45] Date of Patent: Jul. 19, 1994

[54] DATA PROCESSING APPARATUS WITH SELF-REPEAT FUNCTION

[75] Inventors: Noriaki Kabeya, Aichi; Misao Kataoka, Mie, both of Japan

[73] Assignee: Brother Kogyo Kabushiki Kaisha, Nagoya, Japan

[21] Appl. No.: 645,486

[22] Filed: Jan. 24, 1991

[30] Foreign Application Priority Data

Apr. 27, 1990 [JP] Japan .................. 2-112045

[51] Int. Cl.$^5$ ................................ G06F 3/02
[52] U.S. Cl. .................. 345/172; 345/146; 341/22; 400/369
[58] Field of Search .............. 341/23, 26, 22, 24, 341/29, 27; 178/17 C; 400/477, 480, 485, 368, 369; 340/709, 711, 706, 721, 712, 747; 345/112, 116, 145, 168, 172

[56] References Cited

U.S. PATENT DOCUMENTS

| | | | |
|---|---|---|---|
| 31,942 | 7/1885 | Klehm, Jr. .................. | 340/711 |
| 3,808,363 | 4/1974 | Kieffer .................. | 400/477 |
| 4,016,365 | 4/1977 | Staar .................. | 340/711 |
| 4,024,534 | 5/1977 | DuVall .................. | 341/26 |
| 4,263,582 | 4/1981 | Dumbovic .................. | 341/26 |
| 4,323,888 | 4/1982 | Cole .................. | 400/368 |
| 4,410,957 | 10/1983 | Cason et al. .................. | 340/711 |
| 4,460,974 | 7/1984 | Jones .................. | 340/711 |
| 4,490,055 | 12/1984 | Johnson et al. .................. | 341/22 |
| 4,527,917 | 7/1985 | Ueno .................. | 340/709 |
| 4,586,035 | 4/1986 | Baker et al. .................. | 340/706 |
| 4,609,908 | 9/1986 | Amano .................. | 341/22 |
| 4,617,554 | 10/1986 | Krause et al. .................. | 341/26 |
| 4,688,020 | 8/1987 | Kuehnemann et al. .................. | 341/23 |
| 4,739,310 | 4/1988 | Yamamoto .................. | 340/711 |
| 4,768,164 | 9/1988 | Dreher .................. | 364/900 |
| 4,804,278 | 2/1989 | Gotou et al. .................. | 400/368 |
| 4,812,832 | 3/1989 | Oishi et al. . | |
| 4,823,311 | 4/1989 | Hunter et al. .................. | 340/712 |
| 4,896,290 | 1/1990 | Rhodes et al. .................. | 340/721 |
| 4,898,483 | 2/1990 | Iizuka .................. | 340/711 |
| 4,953,120 | 8/1990 | Nishiyama .................. | 340/711 |
| 5,136,506 | 9/1992 | Toshiyuki .................. | 340/711 |

Primary Examiner—Alvin E. Oberley
Assistant Examiner—Steven J. Saras
Attorney, Agent, or Firm—Oliff & Berridge

[57] ABSTRACT

A data processing apparatus comprises a keyboard having a plurality of keys assigned to a plurality of functions; an executing controller for executing the function assigned to a key when operated on the keyboard; an output device for outputting the result of execution performed by the executing controller; a self-repeat controller for controlling the executing controller in such a manner that the function assigned to a continuously depressed key is executed repeatedly; a selection routine setting controller for selecting a selection routine in which a desired processing routine is selected from among a plurality of processing routines; a transition effecting controller, when the selection routine is selected by the selection routine setting controller, for regarding as a command for transition to the selected processing routine the depression of a key corresponding to a certain function in another processing routine, thereby effecting transition to the selected processing routine; and an inhibiting controller for inhibiting the operation of the self-repeat controller if a key, which is regarded as one giving a processing routine selection command when operated, is kept depressed after transition to the selected processing routine. Thus, after the operator has operated a key to specify transition to a desired processing routine and the transition has been executed, the inhibiting controller inhibits the operation of the self-repeat controller so that depressing the same key continuously never leads to executing the function assigned thereto.

12 Claims, 5 Drawing Sheets

DATA PROCESSING APPARATUS WITH SELF-REPEAT FUNCTION

BACKGROUND OF THE INVENTION

1. Field of the Invention

The present invention relates to a data processing apparatus capable of suppressing its self-repeat function under certain conditions.

2. Description of the Related Art

Many prior art data processing apparatuses consist of a keyboard having a large number of key switches arranged thereon, an apparatus proper for processing the input data resulting from keyboard operations, and an output device (printer, display unit, etc.) on which to output the data coming from the keyboard. Some English language word processors have a keyboard and a display unit which displays a plurality of lines. Word processors of this type operate in one of two modes: word processing editing mode or typewriter mode. In the word processing mode, input data from the keyboard is displayed on the display unit to create or edit documents, and no data is printed out. In typewriter mode, every keystroke on the keyboard results in a print operation of the corresponding character on the printer.

The keys on the keyboard comprise not only character keys but also function keys. On some models of word processors, offering a variety of functions, the number of keys available on the keyboard is not sufficient to accommodate all the functions. As a result, some keys represent more than one function. For example, the return key may be used to change lines during actual word processing and to specify execution of a selected menu item when a menu is displayed. These keys, each representing a plurality of functions and used to specify them, are called multipurpose keys.

During menu display, the display unit displays a menu of items indicative of various actions. Using cursor movement keys, an operator positions the cursor at a desired item shown on the display unit. Pushing the return key erases the menu display screen and executes the action represented by the selected item by displaying a screen, or first screen, of the processing action.

With many word processors, some of the keys on the keyboard are called self-repeat function keys. These keys, which include cursor movement keys, the space key and the return key, each execute an assigned function once when operated once and repeatedly when held down longer than a predetermined period of time (e.g., 0.5 sec.).

To illustrate, when selecting word processing/editing mode from the menu display, the operator moves and positions the cursor to the corresponding action indicator on the menu display screen and then presses the return key for execution. One disadvantage of the above self-repeat function scheme is that the operator sometimes inadvertently keeps depressing the return key after word processing/editing mode is selected. The continuous depression of the return key executes the line change routine, which is another return key function. As a result of this, the screen is scrolled. When the operator becomes aware of the undesired scrolling and releases the return key, it is necessary to move the cursor back to the first line. Thus, redundant operation, or carriage return, caused by the lengthy depression of the return key, delays the start of work in the word processing/editing mode. Similar disadvantages are also observed with other multipurpose, self-repeating keys.

SUMMARY OF THE INVENTION

It is therefore an object of the present invention to provide a data processing apparatus capable of avoiding the execution of unnecessary self-repeat operations when a multipurpose key is inadvertently kept depressed.

In carrying out the invention, there is provided a data processing apparatus comprising: a keyboard having a plurality of keys associated with a plurality of key functions; an executing means for executing the function assigned to a key operated on the keyboard; an output means for outputting the result of execution performed by the executing means; a self-repeat means for controlling the executing means in such a manner that the function assigned to a continuously depressed key is executed repeatedly; a selection routine setting means for selecting a selection routine in which a desired processing routine is selected from among a plurality of processing routines; a transition effecting means, when the selection routine is selected by the selection routine setting means, for regarding as a command for transition to the selected processing routine the depression of a key corresponding to a certain function in another processing routine, thereby effecting transition to the selected processing routine; and an inhibiting means for inhibiting the operation of the self-repeat means if a key, which is regarded as one giving a processing routine selection command when operated, is kept depressed after transition to the selected processing routine.

Thus, after the operator has operated a key to specify transition to a desired processing routine and the transition has been executed, the inhibiting means inhibits the operation of the self-repeat means so that continued depression of the same key does not execute the function assigned thereto. Therefore, when transition to a processing routine is effected by operating a key and that key is inadvertently kept depressed thereafter, the operator avoids executing an unnecessary function in the new processing routine. This allows the operator, after transition to the selected processing routine, to immediately start performing desired data input without the necessity for corrective operations. As a result, the operability of the data processing apparatus according to the invention is significantly enhanced and the operator is able to perform data processing operations with appreciably high levels of efficiency.

BRIEF DESCRIPTION OF THE DRAWINGS

A preferred embodiment of the present invention will be described in detail with reference to the following Figures wherein.

DESCRIPTION OF THE PREFERRED EMBODIMENT

One embodiment of the data processing apparatus according to the invention will now be described with reference to the accompanying drawings.

Figure 1:
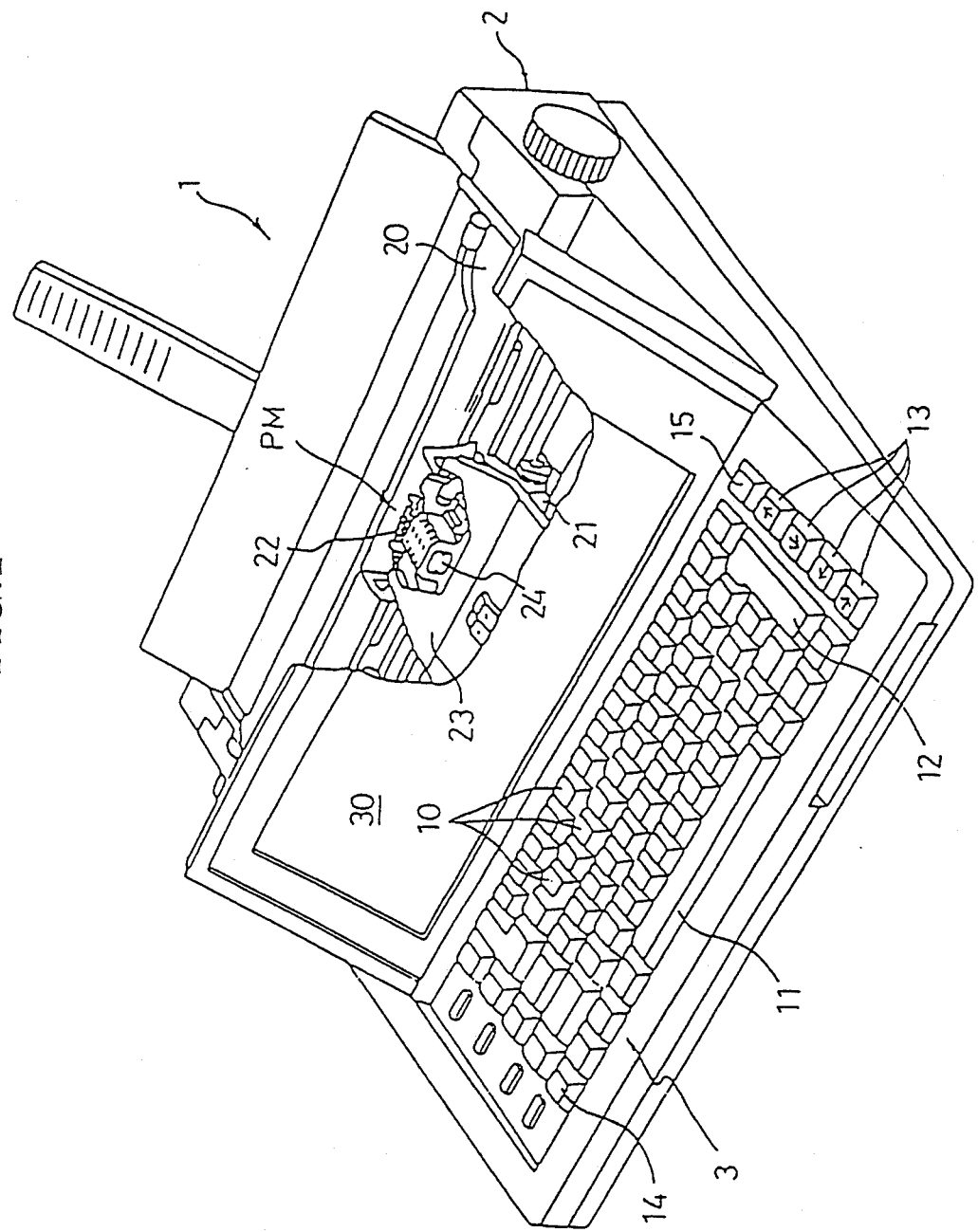
FIG. 1 is a perspective view of a data processing apparatus embodying the invention in the form of an English language word processor.
Figure 2:
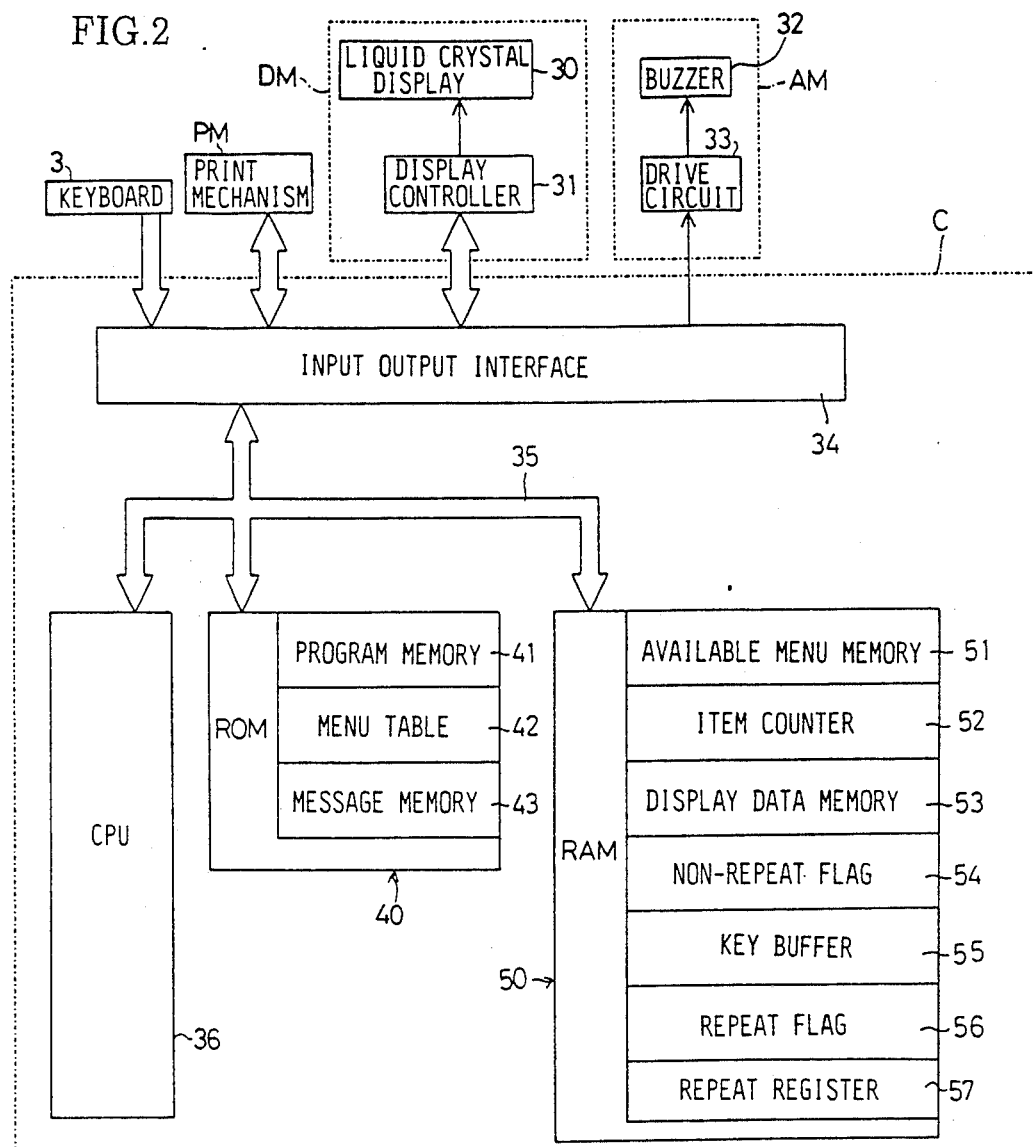
FIG. 2 is block diagram of a controller for use with the embodiment of FIG. 1.

FIG. 1 is a perspective view showing a word processor according to the embodiment and FIG. 2 is a block diagram of a controller for use with the embodiment. In describing this embodiment, it is applied to an English language word processor although it is applicable to one for any language.

As shown in FIG. 1, a keyboard 3 is installed at the front of a body frame 2 of a word processor 1. To the rear of the keyboard 3, and inside the frame 2, is a type wheel print mechanism PM. Also to the rear of the keyboard 3 is a liquid crystal display 30 capable of displaying up to seven lines of characters and symbols. The display 30 is rotatably mounted between the position shown in FIG. 1 and a storage position in which display 30 is laid substantially flat on the frame.

The keyboard 3 comprises alphanumeric and symbol keys 10, a space key 11, a return key 12, cursor movement keys 13 for moving a block cursor 60 both vertically and horizontally within the display 30, a menu key 14 for inputting a command by which to display menu items on the display 30, a cancel key 15 for canceling the execution of various routines, and diverse function keys.

The print mechanism PM is conventional and constitutes a platen 20 for feeding print paper, a carriage 21 which moves along the platen 20, a petal-shaped daisy wheel 22 having type characters/symbols mounted at the tips of the radially extended spokes, a ribbon cassette 23 containing a type ribbon, and a hammer solenoid 24 for striking the spoke tips.

Referring to FIG. 2, an alarm mechanism AM comprises a buzzer 32 and a drive circuit 33 for activating the buzzer 32.

A controller C comprises a CPU 36, an I/O interface 34 connected to the CPU 36 via a bus 35 (e.g., data bus), a ROM 40 and a RAM 50.

A program memory 41 in the ROM 40 contains a menu display control program and control programs for controlling the print mechanism PM and the display mechanism DM in response to the code data coming from the keyboard 3.

A menu table 42 in the ROM 40 contains a menu item count N, message numbers assigned to the menu items, and action codes for designating the contents of the action assigned to each menu item.

A message memory 43 in the ROM 40 contains a large number of data items representing message numbers combined with message information (item name data) to be displayed on the display 30. The message information comprises code data for character strings constituting the menu items. The character strings contain a qualification start code and a qualification end code before and after each character to be qualified.

The RAM 50 comprises an available menu memory 51, an item counter 52, a display data memory 53, a non-repeat flag 54, a key buffer 55, a repeat flag 56, a repeat register 57, and miscellaneous memory areas. The available menu memory 51 stores a 1 for an available item and a 0 for an unavailable item depending on the word processor status in effect when the menu key 14 is operated. The item counter 52 is used to designate menu items successively. The display data memory 53 stores message data for the menu items to be displayed on the display 30. The non-repeat flag 54 is used to inhibit the self-repeat function of a key. The key buffer 55 temporarily stores the code data of a key on the keyboard 3 when that key is kept depressed. The repeat flag 56 is used to execute the self-repeat function. The repeat register 57 stores the code data of a key when that key is the object of a self-repeat operation. The miscellaneous memory areas temporarily store the results of processing performed by the CPU 36.

Figure 3:
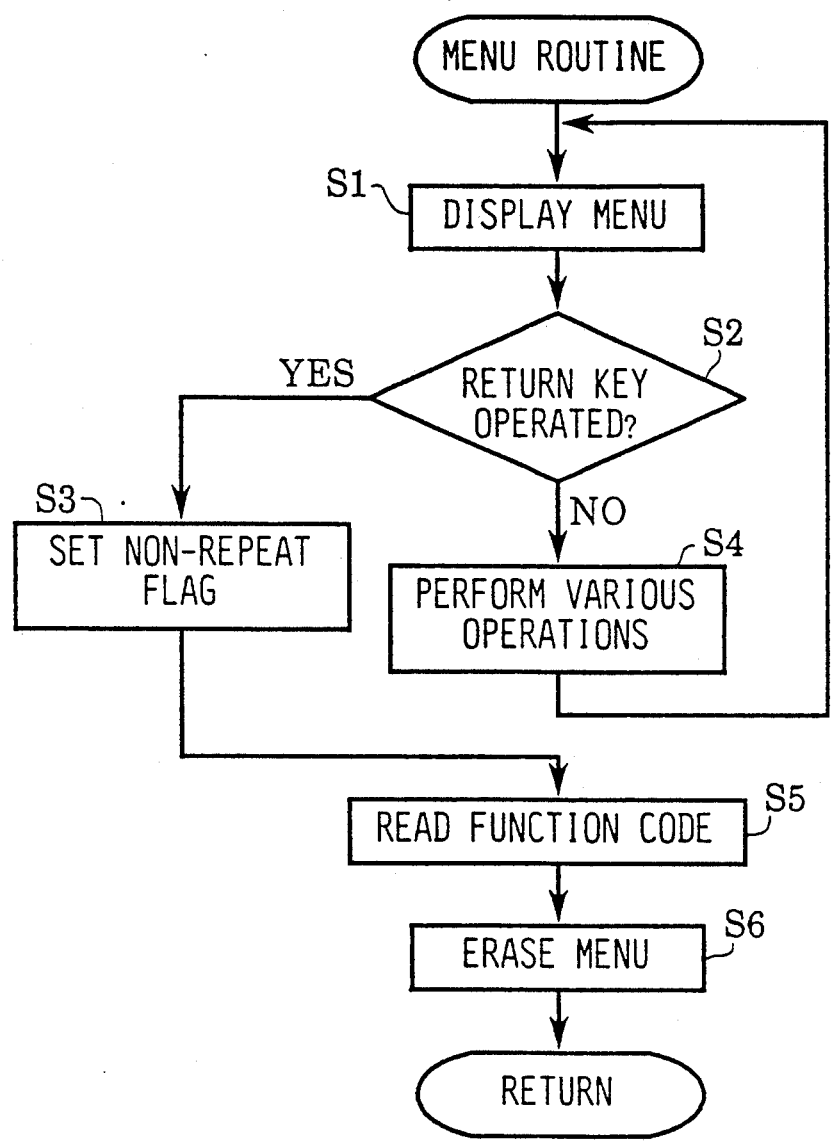
FIG. 3 is a flowchart describing a menu routine as it is executed by the controller of FIG. 2.
Figure 4:
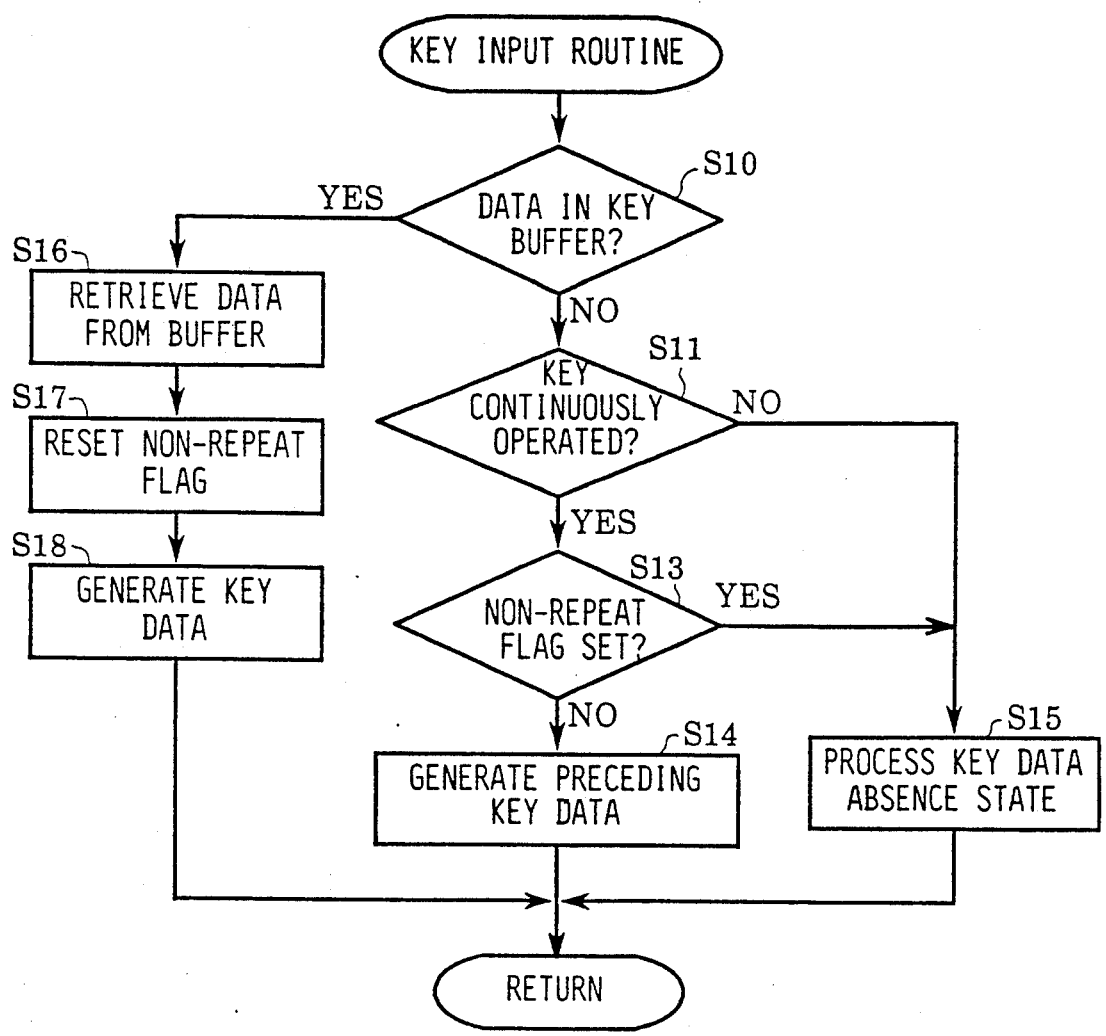
FIG. 4 is a flowchart describing a key input routine as it is executed by the controller of FIG. 2.

FIGS. 3 and 4 are flowcharts describing the menu routine and the key input routine, respectively, the routines being executed by the controller C. How these routines work will be described with reference to these flowcharts.

In FIG. 3, when the menu key 14 is operated, a control program checks to see if each of the menu items is available in the current word processor status. A 1 is placed in the available menu memory 51 for an available menu item and a 0 is placed therein for an unavailable item. Thereafter, the menu routine is begun. In step S1, the menu screen is displayed on the display 30. When the menu display processing is started, the item count N stored in the menu table 42 is sent to the item counter 52. Then the message number of the menu item indicated by a count value I on the item counter 52 is read. The message information corresponding to the message number is read from the message memory 43. Each character code of the message information is developed into two bytes and written to the display data memory 54 as described.

A search is made through the data in the available menu memory 51. If the availability bit corresponding to the count value I on the item counter 52 is found to be set to 1, the menu item is displayed, at an appropriate position on the display 30, in boldface-qualified characters. Thereafter, the count value I on the item counter 52 is decremented by 1. Likewise, if the menu item is found to be unavailable, the item is displayed in standard format on the display 30. This processing continues until the count value I reaches 0. Each available item is displayed in boldface and each unavailable item in standard type on the display 30. Therefore, by simply taking a look at the boldface character qualification on the display 30, the operator knows which of the menu items are available.

In step S2, the controller C checks to see if the return key 12 is operated. If the return key 12 is not operated, no item is executed, and step S4 is reached. In step S4, various operations may be carried out on the menu display screen. For example, the operator may operate the cursor movement keys 13 to position the cursor to the item to be executed.

Figure 5:
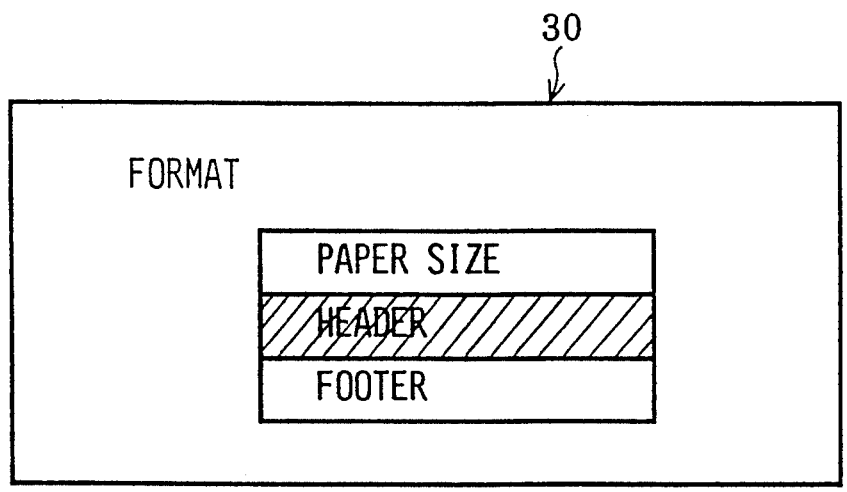
FIG. 5 is a view illustrating a typical menu display.

To use a specific example, if the menu key 14 had been operated when the word processor was ready to set a document format, the menu items shown in FIG. 5 are displayed on the display 30. In FIG. 5, "PAPER SIZE" is an item for setting the size of the paper on which to print data; "HEADER" is an item for setting the header of a document; and "FOOTER" is an item for setting the footer of a document. These items are displayed in boldface, indicating that any of them may be selected by positioning the cursor thereto. In FIG. 5, the cursor is seen positioned to the second item "HEADER" following the operation of the cursor movement keys 13.

Pushing the return key 12 in the above state specifies execution of the function represented by the menu item currently selected with the cursor. In the example of FIG. 5, transition to the header processing action is specified by operating the return key 12.

As the return key 12 has been operated in step S2, step S3 is reached in which the non-repeat flag 54 is set (ON). Step S3 is followed by step S5 wherein the action code specific to the selected action is read from the menu table 42.

In step S6, the menu display is erased from the display 30. Thereafter, the menu routine is terminated and control returns to the main routine.

The main routine comprises routines that execute the processing of the action selected according to the action code that was read out in step S5. These subordinate routines include the key input routine whose processing flow is depicted in FIG. 4. The key input routine generates key data specific to any key that may be operated on the keyboard 3. The key input routine is executed through interruption handling. When this routine is started, a check is made in S10 to see if data is stored in the key buffer 55. The key buffer 55 is a memory that temporarily stores key data assigned to keys that are operated; this buffer is a stack memory that successively stores key data. No data in the key buffer 55 means that no other key was operated after the return key 12 was operated to execute the current function. Specifically, the data assigned to the return key 12 is stored temporarily in the key buffer 55 when the return key 12 is operated for function execution before step S3. Upon function execution (i.e., in step S5), the CPU 36 reads the data from the key buffer 55. This leaves the key buffer 55 empty. While one key is kept depressed, no new data is placed in the key buffer 55. That is, if the return key 12 is continuously depressed, or no other key is operated after operation of the return key 12, the key buffer 55 remains empty.

If the check in step S10 reveals there is no data in the key buffer 55, step S11 is reached. In step S11, a check is made to see if the key is continuously operated. The check of step S11 is based on whether or not the repeat flag 56 is set (ON). The repeat flag 56 is set (ON) by interruption handling when the same key is held down longer than a predetermined period of time (e.g., 0.5 sec.) and is reset (OFF) when the key is released.

If the return key 12 is continuously depressed after its operation for function execution and the repeat flag 56 is set (ON), then step S13 is reached. In step S13, a check is made to see if the non-repeat flag 54 is set (ON). The result of the check in step S13 is affirmative since the non-repeat flag 54 was set (ON) in step S3 of FIG. 3. In step S15, the absence of key data is recognized and suitably processed. That is, the continuous depression of the return key 12 is ignored and the next stage of processing is reached.

In summary, the above steps comprise designating a displayed menu item with the cursor and selecting for execution the action assigned to the selected item by depressing the return key 12. If, after the screen of the display 30 is replaced by the screen of the selected action, the operator inadvertently keeps depressing the return key 12, the cursor will remain at its initial position on the first screen of the selected action. That is, lines are not advanced in response to the continued depression of the return key 12 as would normally be the case in the word processing/editing mode. In this manner, the embodiment eliminates the prior art disadvantage of the cursor needlessly advancing a number of lines when the operator fails to release the return key 12 immediately after operating it to execute the action selected from the menu display. Thus, the operator does not have to take the time to return the inadvertently displaced cursor to its initial position for the selected action before starting the processing of that action. This allows the operator to improve his or her efficiency.

If a key other than the return key 12 is operated after execution of the selected action, the data corresponding to the operated key is placed in the key buffer 55. In that case, the result of the check in step S10 becomes affirmative. Step S10 is then followed by step S16 in which the data in the key buffer 55 is sent to the CPU 36. In step S17, the non-repeat flag 54 is reset (OFF). Therefore, if the return key 12 is subsequently operated, the primary function of the return key 12, i.e., the line change function, is executed.

If a key equipped with the self-repeat function other than the return key 12 is continuously depressed, steps S10, S11, S13 and S14 are carried out, in that order, so that the function of the currently depressed key is repeatedly executed. While the self-repeat function is being executed, the same data is not written repeatedly to the key buffer 55, rather, after the first pass of processing is made based on the keyed-in data, the data is placed in the repeat register 57. With the self-repeat function in effect, the data in the repeat register 57 is repeatedly read and processed so that the same function is continuously executed.

If the return key 12 is operated to select a menu item and is released immediately thereafter, and if no other key is subsequently operated, steps S10, S11 and S15 are carried out. There being no processed key data, i.e., it is absent, no processing is performed.

In describing this embodiment, it was assumed that the return key 12 doubles as a key for designating the execution of a selected item in a menu display. However, the invention is not limited to this scheme. Alternatively, the invention may be applied to an embodiment in which some other self-repeat function key doubles as a key for designating action execution.

In the above-described embodiment, the function of the return key 12 is repeated on the screen of the display 30. Alternatively, the invention may also be applied to other types of output devices such as a printer in which the self-repeat function is used.

It is to be understood that while the invention has been described in conjunction with a specific embodiment, it is evident that many other alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:

1. A data processing apparatus, comprising:
   a keyboard having a plurality of keys assigned to a plurality of functions;
   an executing means for executing a function assigned to a key operated on the keyboard;
   an output means for outputting the result of execution performed by the executing means;
   a self-repeat means for controlling the executing means in such a manner that the function assigned to a continuously depressed key is executed repeatedly;
   a selection routine setting controller for setting a selection routine in which a desired processing routine is selected from among a plurality of processing routines;

a transition effecting means for regarding as a command for transition to the selected processing routine the depression of a key having a certain function in the selected processing routine, thereby effecting transition to the selected processing routine; and an inhibiting means for inhibiting the operation of the self-repeat means in the selected processing routine if the key, which is regarded as one giving a processing routine selection command when operated, is depressed before transition to the selected processing routine and continues to be depressed in the selected processing routine after transition, wherein the key has a certain function that is to be repeatedly performed by the self-repeat means when the key is continuously depressed after transition to the selected processing routine.

2. The data processing apparatus as claimed in claim 1, said keyboard has a self-repeat key assigned a line feed function in the selected processing routine.

3. The data processing apparatus as claimed in claim 1, wherein said output means comprises a display screen.

4. The data processing apparatus as claimed in claim 3, wherein said selection routine setting controller further comprises:

a menu display means for displaying on said display screen a menu indicating the plurality of processing routines; and a designating means for designating a desired processing routine from the plurality of processing routines based on the menu displayed by the display means.

5. The data processing apparatus as claimed in claim 4, wherein said designating means for designating the desired routine comprises means for moving a cursor displayed on said display screen.

6. The data processing apparatus as claimed in claim 5, wherein said keyboard has a self-repeat key assigned a line feed function in the selected processing routine.

7. A data processing apparatus as claimed in claim 1, further comprising a permitting means for permitting the operation of the self-repeat means if the key is released and then a key of the keyboard is depressed after the inhibiting means inhibits the operation of the self-repeat means.

8. A process for use with a data processing apparatus having a keyboard, a control means, and an output device, comprising the steps of:

defining at least two operating routines used by the apparatus;

assigning at least one function to each key of the keyboard for each operating routine;

designating the function performed by one of said keys as a repeating function in one of said at least two operating routines;

transitioning from a first operating routine wherein the function of a key causes the transition to a second operating routine wherein the function of the key for producing the transition has designated a repeating function in the second operating routine;

inhibiting said designated repeating function of the key immediately after completion of said transitioning step; and activating the designated repeating function of the key in the second operating routine.

9. A process as claimed in claim 8, wherein said step of activating the designated repeating function comprises the steps of:

releasing the key after completion of said transitioning step; and redepressing the key longer than a predetermined time to initiate the repeating function of the key in said second operating routine.

10. A process as claimed in claim 8, wherein the step of transitioning is initiated by depressing the key.

11. A process as claimed in claim 10, further comprising the step of initiating the repeating function in said second operating routine by releasing the key and redepressing the key for a time longer than a predetermined time.

12. A process as claimed in claim 11, wherein the key for producing the transition has a line advance function in said second operating routine.

* * * * *